May 29, 1934.
L. S. TRACY
1,960,932
METHOD OF MINING
Filed July 21, 1933
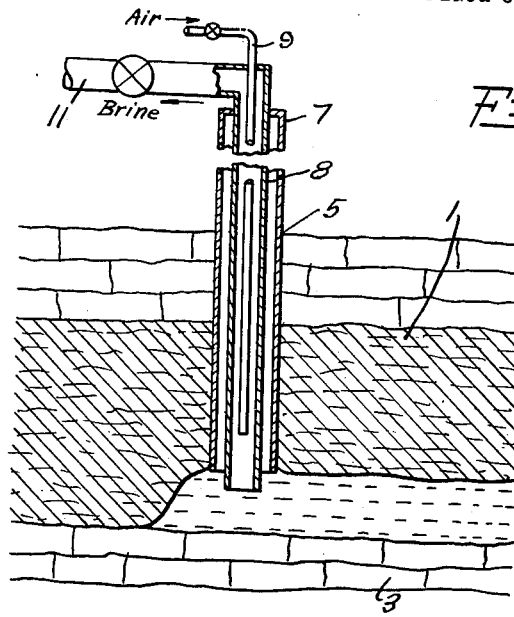
Fig. 1.
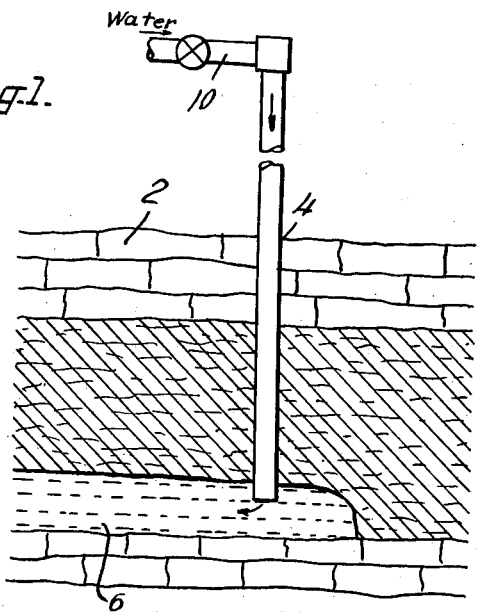
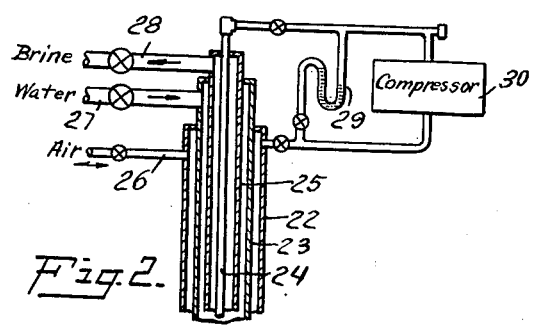
Fig. 2.
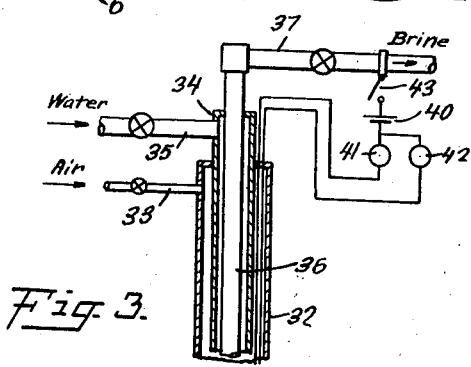
Fig. 3.
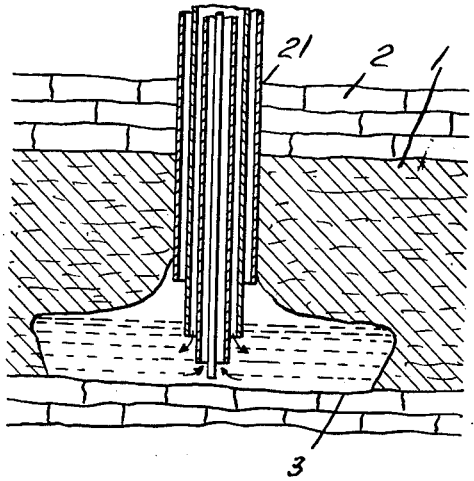
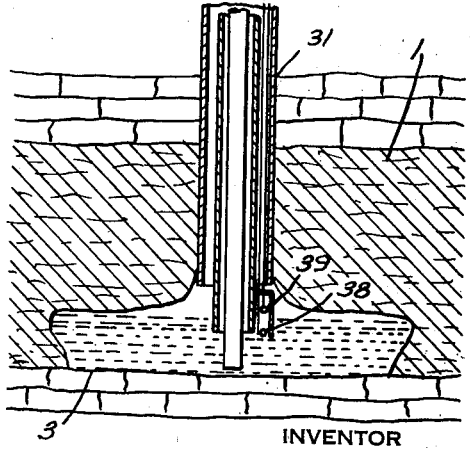
INVENTOR
Lyndon S. Tracy
BY
ATTORNEY Patented May 29, 1934

1,960,932

UNITED STATES PATENT OFFICE 1,960,932

METHOD OF MINING

Lyndon Sanford Tracy, Syracuse, N. Y., assignor to The Solvay Process Company, Syracuse, N. Y., a corporation of New York Application July 21, 1933, Serial No. 681,464

10 Claims. (Cl. 262—3)

This invention relates to the recovery of soluble materials from natural deposits thereof and is especially directed to a new method for removing common salt from subterranean deposits in a more efficient and complete manner than has been possible by prior art processes.

Salt frequently occurs as strata of varying thickness at various depths below the earth's surface. Some times a number of strata of the salt may occur, one above the other and separated by strata of other material, such as shale, etc. In the past it has been customary to remove salt from such beds, existing a material distance below the earth's surface, by drilling wells into the bed of salt which it is desired to recover. The well shaft is provided with a tube or casing of, for example, 8 or 10 inches diameter. This casing is extended down to approximately or slightly above the upper surface of the salt stratum, and a tube is run down concentrically within the casing to a point near the bottom of the stratum. One of these serves as an inlet tube and the other as an outlet tube. Water is then introduced into one of the tubes in such a manner as to flood the salt bed and dissolve the salt from the bed forming a substantially saturated brine. The brine formed is withdrawn through the other tube and conducted to the surface where it is either evaporated to form salt or used in its existing condition to produce other compounds. The water may be introduced at a sufficient pressure to force the heavier brine up through the outlet tube and out through the top of the well, or an air lift or a pump may be utilized in the brine pipe.

When such methods of recovering salt are employed in a geological formation in which the material above the salt bed is of a soft nature and subject to erosion, or relies on the salt formation for its support, as is the case in some shale formations, caving of this material frequently occurs. As a result of this caving the brine pipes or the casing may become plugged or broken and eventually the surface of the salt bed, formerly exposed to the dissolving action of the water, becomes covered up. Consequently, after the well has been operated for a sufficient length of time so that substantial caving has resulted, contact of the water with the salt is reduced to such an extent that production of brine either with respect to concentration or volume is substantially retarded. In some cases this caving may be so extensive as to necessitate an abandonment of the well.

It is an object of the present invention to overcome the disadvantages of prior processes and to effect the removal of salt from such underground salt beds in such a manner that caving is minimized, in many cases entirely avoided, so that substantially the entire salt content of the bed can be removed before it is necessary to abandon a well.

In accordance with the present invention, instead of pumping water into a single shaft and removing it from the same shaft, two or more shafts are located a considerable distance apart and are suitably connected by a channel or tunnel through or beneath the salt bed. Water is then introduced through one of the shafts and dissolves salt in the salt bed, forming brine. This brine is then withdrawn through the other shaft in any suitable manner, as by pumping, air lift, or other means.

By effecting the removal of salt in the above manner the most rapid solution is effected near the point at which the water enters the salt bed and as the water travels toward the outlet, its salt concentration becomes greater until only relatively saturated salt solution reaches the outlet. Consequently, if any caving results from the dissolving away of salt from beneath the stratum thereabove, this caving will take place near the point of entry of the water and hence at a point remote from the removal of the brine. The solution leaving the salt bed, being relatively saturated, will dissolve away little or no salt around the outlet and accordingly the salt bed will remain intact and minimize caving at this point.

The tunnel or channel between the inlet shaft and the outlet shaft is below the top of the salt stratum and preferably along the lower portion or along the bottom thereof so that the salt will be first dissolved away from the bottom portion of the bed and the bed of salt remaining will assist in supporting the mineral stratum thereabove. In this manner a salt bed may be far more completely exhausted before abandonment of a well than formerly and relatively little attention to cleaning of the well is required. Also with the passage or channel along the bottom of the bed and separate shafts for inlet and outlet respectively, the strong brine as formed gravitates towards the outlet well or shaft from all points in the cavity. Any suitable method of obtaining a channel between shafts may be employed. This will depend to a considerable extent upon the specific conditions prevalent at the salt deposit.

Two methods that have been found especially efficacious are shown by way of illustration. It will be understood, however, that my invention is not limited to these methods but covers any of the numerous methods that may readily be devised for effecting the channeling or tunneling through the salt bed.

In the drawing,

Fig. 1 illustrates my method of removing salt by means of two shafts located some distance apart;

Fig. 2 illustrates diagrammatically apparatus by which the salt bed may be undercut so as to provide a tunnel or channel therebeneath; and Fig. 3 shows diagrammatically an alternative apparatus for effecting a similar result.

With specific reference to Fig. 1 of the drawing, numeral 1 designates the salt bed positioned between two strata 2 and 3 of shale or other mineral matter. Into the salt bed 1 two shafts 4 and 5 are sunk in any suitable manner and connected by a channel or tunnel 6 preferably along the bottom of the salt bed as shown. Shaft 5 may be made large enough to permit descent of men and equipment to construct the horizontal or laterally directed tunnel 6, and shaft 4 (which may be relatively small compared with shaft 5) may be drilled to connect with the far end of horizontal tunnel 6. Shaft 5 is provided with a suitable casing 7 in which is disposed a brine withdrawal pipe 8. An air supply pipe 9 is provided within pipe 8 for introducing air in order to remove the brine through pipe 8. Shaft 4 is provided with a water inlet pipe 10 for maintaining a suitable supply of water in the salt bed.

In the operation of this apparatus water is introduced through pipe 10 into shaft 4 and flows down the shaft into the salt bed 1 and along channel 6, dissolving away salt and forming brine. The lower end of pipe 8 is submerged in this body of brine and air is introduced through pipe 9 to lower the pressure head of the brine column in pipe 8. The shaft 4 may be filled with water and, because of the pressure of this column of water in conjunction with the air introduced into pipe 8, the brine passes out from pipe 8 through outlet 11. Instead of employing an air lift for removing brine, any other method of removing it may be employed, such as a pump or pressure applied to the tunnel or other means. More than one shaft may be provided for the introduction of water or the removal of brine or both and these may be arranged as desired, due consideration being given, of course, to the subterrane.

In Fig. 2 is illustrated one method for effecting the undercutting of a salt bed so as to produce a tunnel or channel therebeneath, without requiring the sinking of a large shaft and the entry of miners to cut the lateral shaft in the salt bed. Into the salt bed 1, between the upper stratum 2 and the lower stratum 3 a shaft 21 is drilled. This shaft is provided with a casing 22 of eight inch diameter, for example, within which are located a supply tube or pipe 23 for introducing water into the salt bed, the pipe 24 for measuring pressure in the salt bed, and a tube or pipe 25 for withdrawing brine therefrom. The lower end of the casing 22 may be packed off in any convenient manner to prevent leakage. Additional packings may be provided where necessary or desirable for preventing the seepage of water from upper levels, as well known in the art. The casing 22 may be provided with an air inlet and outlet 26. However, air may be supplied in any desired manner to the well. It may be desirable, for instance, to provide a separate pipe for introducing air into the system. Valve controlled water inlet 27 and brine outlet 28 are provided on pipes 23 and 25 respectively. Numeral 29 represents a differential pressure gauge and the numeral 30 an air compressor.

In the operation of this apparatus water is introduced at inlet 27 into tube 23 the lower end of which is preferably somewhat below the desired water level in the salt bed. Air pressure is maintained in the cavity by means of the air inlet 26 corresponding to the hydrostatic pressure of the column of liquor in the pipes. By a pump in the water inlet pipe 27, 23, or the brine outlet pipe 25, 28 to overcome the difference in hydrostatic pressure of the column of liquor in these two pipes the water is caused to flow down into the well cavity through pipe 23 and the brine to overflow and be removed through outlet 28. This flow may be assisted by an air lift in pipe 25 operating as described above in connection with Fig. 1.

Water is introduced into the well and brine is removed therefrom at a rate corresponding to the desired concentration of salt in the outflowing brine while maintaining the desired level of liquor or brine in the salt bed. This level is determined by means of the differential pressure gauge 29 and compressor 30. For example, when it is desired to determine the depth of the body of water in the salt bed, the depth being measured from the lower end of pipe 24, the compressor 30 is put in operation so as to drive brine from the pipe 24. When all the brine is driven from pipe 24, the pressure on pipe 24 at the lower end will be the pressure on the casing 22 plus the pressure of a column of brine equal to the depth of the body thereof in the well cavity. Since the differential pressure gauge 29 is located between casing 22 and pipe 24, the pressure due to the depth of the body of brine will be readable directly on this gauge, which may be suitably calibrated for the purpose. If the depth of the body of brine in the salt bed is too great, air may be introduced at 26 to raise the pressure on the surface of the body of brine, thus forcing excess from the cavity and reducing the depth of the brine in the cavity. Where the brine level is too low, air may be exhausted at 26 so as to raise the level of the brine in the salt bed.

In normal operation the depth of the body of brine in the bottom of the salt bed may be only 10 or 15 feet whereas the salt bed may be anywhere from about 25 to 200 feet in thickness or even more depending on the nature of the salt deposit. The invention is of particular advantage in removing salt from beds the thickness of which is less than about 150 feet. By maintaining the body of brine at a depth less than the thickness of the salt bed, solution of salt from the bed near the top thereof is minimized. By adding water at the top of the body of brine, the added water tends to spread over the top of the brine and reach the edges of the cavity in the salt bed. Upon contact of water or relatively dilute brine with the edges of the cavity, it dissolves salt therefrom forming strong brine. This brine, its density being greater, sinks and since brine is being removed through tube 25 near the bottom of the cavity, the brine formed along the edges of the cavity flows towards the outlet. In this manner rapid lateral enlargement of the cavity may be obtained yet the upper portion of the cavity is retained firm so as to provide a support for overlying shale or other mineral matter.

In Fig. 3 a similar arrangement is shown for effecting the same purpose. In the apparatus illustrated in this figure a shaft 31 is provided extending through the salt bed to the lower part thereof. This shaft is provided with a casing 32 having air inlet 33. Within the casing 32 a water supply tube 34 having inlet 35 is provided. A brine removal pipe 36 having outlet 37 is disposed within the tube 34. Instead of the pressure method of determining the water level, this apparatus employs an electrical contact method, suitable contacts 38 and 39 being electrically connected to a source of electricity 40 and indicators 41 and 42 through switch 43. The indicators may be lamps, bells, buzzers, or other suitable devices.

In the operation of this apparatus air is supplied through air inlet 33 to the casing 32 so as to maintain a high pressure in the well cavity in a manner similar to that described with respect to Figure 2. Water is introduced at 35 into tube 34, passes down therethrough into the cavity at the bottom of the salt bed 1 and is converted into brine which in turn flows up through pipe 36 and out at outlet 37 all as described above in connection with Fig. 2. In order to determine the depth of the body of brine in the cavity, the switch 43 may be closed, whereby, if the contact 38 is beneath the water level, this will be indicated by actuation of the indicating device 41. If, on the other hand, the water level is above contact 39, the indicator 42 will show this liquid level. By properly regulating the air pressure and the withdrawal of brine and introduction of water, the water level may be constantly maintained between the two contacts 38 and 39 so that solution of salt will be effected to a substantial extent only at the edges of the cavity and the water introduced will disperse over the surface of the body of brine to dissolve away the salt from these edges forming brine, which in turn will sink beneath incoming water and will be expelled through pipe 36.

By operating brine wells in the same salt bed, say 100 or even 200 or 300 feet apart more or less in the above manner, the cavities beneath each well will expand in size until eventually they will come together to form a continuous channel from one well to the other. When this condition has been attained, the regulating apparatus may be withdrawn from the well shaft and the shafts may then be operated in the manner shown in Fig. 1, water being introduced through one shaft and brine being withdrawn through the other in any suitable manner as above described.

Due to the increase in the size of the well cavity after long continued use of two connected shafts or for some other reason, the flow of brine either with respect to strength or volume may finally become such that further operation of the two shafts in accordance with my invention is no longer advantageous. My invention may then be used by drilling a new shaft located for example 100 feet or more from the circumference of the well cavity of the two old shafts and then connecting the new shaft with this cavity in the same manner that the two old shafts were originally connected, that is to say, by a tunnel preferably in the lower portion of the salt bed as described above in connection with Fig. 1 or by salt extraction utilizing compressed air as described above in connection with Figs. 2 and 3. When the connection has been made, the new shaft is then operated in conjunction with one of the old shafts. In this way the underground extraction of the salt may be indefinitely extended, additional shafts being sunk from time to time as the salt deposit becomes exhausted from the vicinity of the old shafts or wells. Preferably the new shaft is located with respect to the old shafts so that it is operated as the new brine outlet in conjunction with the shaft last used as a brine outlet now serving as the inlet for the fresh water, and if desired, water may be introduced into several of the shafts at once and likewise brine may be removed from several shafts at once. Also in developing a salt area, it is preferable to take advantage of the dip, if any, in the salt stratum by starting operations at the higher side and locating the new shafts in the direction of the dip. In this way the outlet shaft is at the lower level so that there is a natural tendency of flow from the water inlet shaft to the brine outlet shaft.

I claim:

1. The process for removing a soluble material from an underground bed thereof, which comprises providing an inlet and an outlet to said bed, said outlet being spaced a substantial distance from said inlet, providing a channel along and below the top of said bed extending from said inlet to said outlet, passing a solvent into said inlet to dissolve said soluble material from said bed forming a solution, and removing the solution from said bed through said outlet.

2. The process for removing salt from a salt bed which comprises introducing water into the salt bed, passing it laterally in contact with and below the top of said salt bed so as to dissolve salt therefrom, and withdrawing the water and dissolved salt from the salt bed at a point remote from the point of introduction of the water thereto.

3. The process for removing salt from a salt bed which comprises introducing water into the salt bed, passing it laterally along the bottom of said salt bed so as to dissolve salt therefrom, and withdrawing the water and dissolved salt from the salt bed at a point remote from the point of introduction of the water thereto.

4. The process for removing salt from a salt bed which comprises providing an inlet and an outlet to said salt bed, said outlet being spaced a substantial distance from said inlet, providing a channel extending from said inlet to said outlet and substantially below the top of said salt bed at said outlet, passing water into said inlet whereby the water dissolves salt from said salt bed to form brine, and removing the brine through said outlet.

5. The process for removing salt from a salt bed which comprises providing an inlet and an outlet to said salt bed, said outlet being spaced a substantial distance from said inlet, providing a channel along and below the top of said salt bed and extending from said inlet to said outlet, passing water into said inlet whereby the water dissolves salt from said salt bed to form brine, and removing the brine through said outlet.

6. The process for removing salt from a salt bed which comprises providing an inlet and an outlet to said salt bed, said outlet being spaced a substantial distance from said inlet, providing a channel along the bottom of said salt bed said channel extending from said inlet to said outlet, passing water into said inlet whereby the water dissolves salt from said salt bed to form brine, and removing the brine at said outlet.

7. The process for removing salt from a salt bed which comprises providing a plurality of shafts extending into said salt bed, providing a channel beneath the mass of salt in the salt bed said channel extending from one of said shafts to another thereof, passing water into one of said shafts so as to dissolve salt from the salt bed to form brine, and withdrawing the brine from another of said shafts.

8. The process for removing salt from a salt bed which comprises providing an inlet and an outlet to said salt bed said outlet being spaced a substantial distance from said inlet, providing a channel along and below the top of said salt bed said channel extending from said inlet to said outlet, continuously passing water from said inlet through said channel to said outlet whereby the water dissolves salt from said salt bed to form brine, and continuously removing the brine at said outlet.

9. The process for removing salt from a subterranean salt bed which comprises providing a plurality of shafts into said salt bed, providing a channel along said salt bed connecting said shafts, continuously introducing water into one of said shafts, and continuously pumping brine out of another of said shafts, said channel being substantially below the top of the salt bed adjacent to the shaft from which brine is pumped.

10. The process for removing salt from a subterranean salt bed, which comprises providing an inlet shaft and an outlet shaft into said salt bed, providing a channel along the bottom of said salt bed connecting said shafts, continuously introducing water into said inlet shaft, maintaining a column of water therein, maintaining a column of brine in said outlet shaft, introducing air into the column of brine to reduce the pressure head of the brine column whereby said brine is forced from said shaft by the pressure exerted by the column of water in the other of said shafts, and whereby the water added continuously passes from said inlet shaft along said salt bed to said outlet shaft dissolving and carrying along salt therefrom.

LYNDON SANFORD TRACY.